Patented June 28, 1927.

1,633,790

UNITED STATES PATENT OFFICE.

ROBERT SETH LINDSTROM, OF CHICAGO, ILLINOIS.

CEMENT COMPOSITION.

No Drawing.  Application filed May 31, 1924. Serial No. 716,958.

The invention relates to cement compositions and seeks to provide an improved composition that is particularly useful for forming the surfacing for concrete floors, stairs, pavements and the like, or of concrete tanks and chutes or other such structures, the surfaces of which are apt to deteriorate upon exposure to wear. One of the chief objections to the use of concrete for floors, stairways, or other structures, the surfaces of which are exposed to attrition, is that such surfaces, particularly if subject to moisture, gradually wear and deteriorate and so give rise to considerable dust. Numerous attempts have been made to prevent disintegration of concrete surfaces exposed to wear and moisture by adding ingredients to the concrete mix or by coating the exposed surfaces, but none have been entirely satisfactory.

I have found that a satisfactory non-dusting, wear and waterproof coating or surfacing can be formed from standard Portland cement that is ground or re-ground to a fineness such that at least 90 per cent will pass through a 200 mesh sieve and admixed with from 5 to 10 per cent by weight, of an abrasive, such as carborundum, of a fineness to pass through a 100 mesh sieve.

Only about 78 per cent of standard Portland cement will pass a 200 mesh sieve and I deem it essential that it be re-ground to very fine powder and such that not more than about 10 per cent will remain on a 200 mesh sieve. Such re-grinding develops the full efficiency of the cement and renders the finished concrete water and moisture-resisting or substantially waterproof and so aids in preventing the deterioration and wear of the surface.

The re-ground cement is intimately and uniformly mixed with an abrasive such as carborundum or iron-free corundum of about 100 mesh fineness and in the proportion of from 5 to 10 lbs. of the abrasive to one cubic foot or 94 pounds of cement. The abrasives specified have a specific gravity of 3.1 or practically the same as that of standard Portland cement, so that the mixture will remain uniform when stored or shipped in dry powdered form and also later on when admixed with sand, or other aggregate, and water and applied as a concrete topping, coating or surfacing to a suitable base. Hence also, it will remain uniformly distributed in the neat cement that rises to and forms the finishing surface of the concrete.

In use, the improved cement composition is admixed with sand or other aggregate or both and water and is applied as a finishing coat to a suitable base such as either green or old concrete. Care should be taken that the water and sand or other aggregate is free from impurities and the aggregate is preferably graded in accordance with Fuller's formula. Hard sharp torpedo sand is preferably employed in the proportions of one cubic foot of the improved cement mixture to one and one-half cubic feet of sand. If desired, the concrete mix may be molded into tile or brick and subsequently laid preferably with the bed and joints of the same composition and mix.

In practice, it is found that the fine reground Portland cement and the abrasive mutually protect each other and prevent the disintegration, wear and dusting of the concrete surface. In place of the carborundum, other abrasives having substantially the same degree of hardness as carborundum and substantially the specific gravity of cement, may be employed, but the abrasive should be practically free of iron compounds that disintegrate upon exposure to moisture.

Changes may be made in the details set forth without departure from the essentials of the invention as defined in the claims

I claim as my invention:

1. A composition adapted, when admixed as described with sand or like aggregate and water, to form a water and wear-resisting, non-dusting, concrete surfacing, for floors, walks, and the like, comprising an intimate admixture in dry powdered form of Portland cement ground to a fineness such that substantially 90 per cent will pass through a 200 mesh sieve, and from 5 to 10 per cent by weight of an iron free abrasive of substantially the hardness and specific gravity of carborundum and of about 100 mesh fineness, substantially as described.

2. A water and wear-resisting, non-dusting, concrete surfacing for floors, stairs, walks, and the like, formed of sand or like aggregate, water, reground Portland cement and an iron free abrasive of substantially the hardness and specific gravity of carborundum, the reground Portland cement and the abrasive being in such proportions and of such degrees of fineness to produce the specified result, substantially as described.

ROBERT SETH LINDSTROM.